United States Patent
Chen et al.

(10) Patent No.: US 10,419,302 B2
(45) Date of Patent: *Sep. 17, 2019

(54) METHOD AND APPARATUS FOR MEASURING USER QUALITY OF EXPERIENCE QOE

(71) Applicant: Huawei Technologies Co., Ltd., Shenzhen, Guangdong (CN)

(72) Inventors: Bing Chen, Shenzhen (CN); Qingpeng Xie, Shenzhen (CN); Lina Sun, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 55 days.

This patent is subject to a terminal disclaimer.

(21) Appl. No.: 15/258,840

(22) Filed: Sep. 7, 2016

(65) Prior Publication Data
US 2016/0380845 A1  Dec. 29, 2016

Related U.S. Application Data

(63) Continuation of application No. 14/014,735, filed on Aug. 30, 2013, now Pat. No. 9,491,065, which is a
(Continued)

(30) Foreign Application Priority Data

Mar. 4, 2011  (CN) .......................... 2011 1 0052138

(51) Int. Cl.
*H04L 12/24* (2006.01)
*H04L 29/06* (2006.01)

(52) U.S. Cl.
CPC ...... *H04L 41/5067* (2013.01); *H04L 41/5038* (2013.01); *H04L 65/80* (2013.01)

(58) Field of Classification Search
CPC .. H04L 41/5067; H04L 65/80; H04L 41/5038
See application file for complete search history.

(56) References Cited

U.S. PATENT DOCUMENTS 6,715,126 B1 * 3/2004 Chang ............ H04N 21/234318
375/E7.01
7,895,629 B1 * 2/2011 Shen ........................ H04N 7/18
710/52
(Continued)

FOREIGN PATENT DOCUMENTS

CN         1929358 A       3/2007
CN       101309400 A      11/2008
(Continued)

OTHER PUBLICATIONS

Minghua Chen, Rate COntrol for Streaming Video over Wireless, 2005 (Year: 2005).*
(Continued)

*Primary Examiner* — Christopher P Grey
(74) *Attorney, Agent, or Firm* — Conley Rose, P.C.

(57) ABSTRACT

The present invention discloses a method for measuring user quality of experience QoE, where the method includes the following steps: receiving event information sent by a receiving end, where the event information includes condition information for determining a cause for shortage of valid media data in a buffer of the receiving end; determining, according to the condition information, whether the shortage of the valid media data in the buffer of the receiving end is caused by a service system or caused by a user's action; and measuring QoE decrease degrees according to different causes for the shortage of the valid media data in the buffer, respectively. In the method for measuring QoE according to embodiments of the present invention, shortage of valid media data in a buffer of a receiving end caused by a service system problem and shortage of valid media data (Continued)

in the buffer of the receiving end caused by a user's action are distinguished, and QoE decrease degrees are measured according to different causes for the shortage of the valid media data in the buffer, respectively, so that QoE is measured more accurately and more objectively, and network resources can be used properly.

14 Claims, 5 Drawing Sheets

Related U.S. Application Data continuation of application No. PCT/CN2011/077490, filed on Jul. 22, 2011.

(56) References Cited

U.S. PATENT DOCUMENTS

| | | | | |
|---|---|---|---|---|
| 8,010,692 | B1* | 8/2011 | Shanson | H04N 21/42607 375/240.01 |
| 8,094,562 | B1* | 1/2012 | Baumbach | H03L 7/0807 370/236 |
| 9,491,065 | B2* | 11/2016 | Chen | H04L 41/5038 |
| 2005/0089043 | A1 | 4/2005 | Seckin et al. | |
| 2006/0146703 | A1 | 7/2006 | Cha | |
| 2006/0146780 | A1* | 7/2006 | Paves | H04N 7/17336 370/348 |
| 2008/0037443 | A1 | 2/2008 | Ansari | |
| 2008/0139189 | A1 | 6/2008 | Hyatt | |
| 2008/0155087 | A1 | 6/2008 | Blouin et al. | |
| 2008/0172441 | A1* | 7/2008 | Speicher | H04L 12/2838 709/201 |
| 2009/0028061 | A1* | 1/2009 | Zaencker | H04L 43/00 370/252 |
| 2012/0218906 | A1 | 8/2012 | Lampinen et al. | |

FOREIGN PATENT DOCUMENTS

| | | |
|---|---|---|
| CN | 101651665 A | 2/2010 |
| CN | 102118270 A | 7/2011 |
| WO | WO 2005/022852 A1 | 3/2005 |

OTHER PUBLICATIONS

Rong Pan, Congestion Control in network with no drops (Year: 2008).*

Rene Serral-Gracia, et al., "Quality of Experience aware multimedia provisioning with Cross-layer Network Management", IEEE Global Telecommunications Conference, Dec. 6, 2010, 5 pages.

"3rd Generation Partnership Project; Technical Specification Group Services and System Aspects; Transparent end-to-end Packet-switched Streaming Service (PSS); Protocols and codecs (Release 9)", 3GPP TS 26.234 v9.5.0, Dec. 2010, 188 pages.

* cited by examiner

METHOD AND APPARATUS FOR MEASURING USER QUALITY OF EXPERIENCE QOE

TECHNICAL FIELD

The present invention relates to the network management field, and in particular, to a method and an apparatus for measuring user quality of experience QoE.

BACKGROUND

In a network application, a network provider and a service provider normally very care about quality of an IPTV (Internet Protocol Television, Internet Protocol Television) service as user watching. A conventional quality of service (Quality of Service, QoS) parameter is incompetent to obviously reflect user experience. In order to indicate the effect of user experience of the IPTV service more directly, a quality of experience (Quality of Experience, QoE) parameter emerges. The QoE may be understood as user experience or user perception, that is, a subjective feeling of an end user about performance of a service provided by a network. By using a nearly quantitative approach, it may represent the end user's experience and feeling about the service and network, and reflect a gap between user's expectation and quality of a current service and network.

In the related art, it is proposed that in a video service, if a trouble occurs on a network, that is, QoS decreases, a video service, being watched at a user end, may be caused to stop therefore, which incurs rebuffering to receiving end. When the rebuffering occurs at the receiving end, the receiving end sends event information to a QoE monitoring server. Upon reception of the event information, the QoE monitoring server starts QoS adjustment to adjust network conditions, thereby ensuring QoE. However, in fact, the rebuffering at the receiving end may also be caused by an operation of the user. For example, in a process of presenting/watching media, dragging performed actively by a user may cause a receiving end to send event information. The receiving end stops and sends the event information, which are caused by the dragging performed by the user, and are unpredictable and cannot be distinguished by a QoE monitoring server. In the prior art, for either the rebuffering at the receiving end caused by deterioration of a network condition or the rebuffering at the receiving end caused by dragging performed by the user, the QoE server measures a change rate of the QoE by using the same QoE measuring method, and starts corresponding QoS adjustment according to the change rate of the QoE to improve the quality of a network server. However, in cases of the rebuffering caused by dragging performed by the user, the network QoS does not decrease. In such cases, starting a QoS adjustment policy may occupy more network resources to some extent, so as to increase a burden on a network and result in improper use of resources. In addition, in the prior art, it is deemed that the QoE will definitely decrease if the QoS decreases, so that QoS adjustment may be immediately started. When a jitter or a data delay occurring occasionally in a network causes the QoE to slightly decrease, the QoS adjustment also needs to be started, so that the QoS adjustment is not flexible, resulting in improper use of network resources.

SUMMARY

To make the proper use of network resources, the present invention provides a method for measuring user quality of experience QoE, where the method is capable of allowing a server to determine a cause for rebuffering a media service, thereby further measuring a QoE decrease degree.

A method for measuring user quality of experience QoE includes the following steps:

receiving event information sent by a receiving end, where the event information includes condition information for determining a cause for shortage of valid media data in a buffer of the receiving end;

determining, according to the condition information, whether the shortage of the valid media data in the buffer of the receiving end is caused by a service system or caused by a user's action; and measuring QoE decrease degrees according to different causes for the shortage of the valid media data in the buffer, respectively.

An apparatus for measuring user quality of experience QoE includes:

a receiving module, configured to receive event information sent by a receiving end, where the event information includes condition information for determining a cause for shortage of valid media data in a buffer of the receiving end;

a determining module, configured to determine, according to the condition information, whether the shortage of the valid media data in the buffer of the receiving end is caused by a service system or caused by a user's action; and a QoE measuring module, configured to measure QoE decrease degrees according to different causes for the shortage of the valid media data in the buffer, respectively.

In the method and apparatus for measuring QoE according to embodiments of the present invention, the receiving end sends event information, where a cause for the shortage of the valid media data in the buffer of the receiving end is reflected by using condition information in the event information, so that the shortage of the valid media data in the buffer of the receiving end caused by a service system problem and the shortage of the valid media data in the buffer of the receiving end caused by a user's action are distinguished. Further, QoE decrease degrees may be measured according to different causes for the shortage of the valid media data in the buffer, respectively, so that the QoE is measured more accurately and more objectively, and network resources can be used properly.

DESCRIPTION OF EMBODIMENTS

The present invention provides a method for measuring user quality of experience, where the method includes:

receiving event information sent by a receiving end, where the event information includes condition information for determining a cause for shortage of valid media data in a buffer of the receiving end;

determining, according to the condition information, whether the shortage of the valid media data in the buffer of the receiving end is caused by a service system or caused by a user's action; and measuring QoE decrease degrees according to different causes for the shortage of the valid media data in the buffer, respectively.

In the method for measuring QoE according to an embodiment of the present invention, condition information in event information sent by a receiving end is used to determine a cause for shortage of valid media data in a buffer of the receiving end, so that the shortage of the valid media data in the buffer of the receiving end caused by a service system problem and the shortage of the valid media data in the buffer of the receiving end caused by a user's action are distinguished; and QoE decrease degrees are measured according to the different causes for the shortage of the valid media data in the buffer, respectively, so that the QoE is measured more accurately and more objectively, and network resources can be used properly.

A method for measuring user quality of experience according to the present invention is hereinafter described in detail by using specific embodiments with reference to accompanying drawings.

Figure 1:
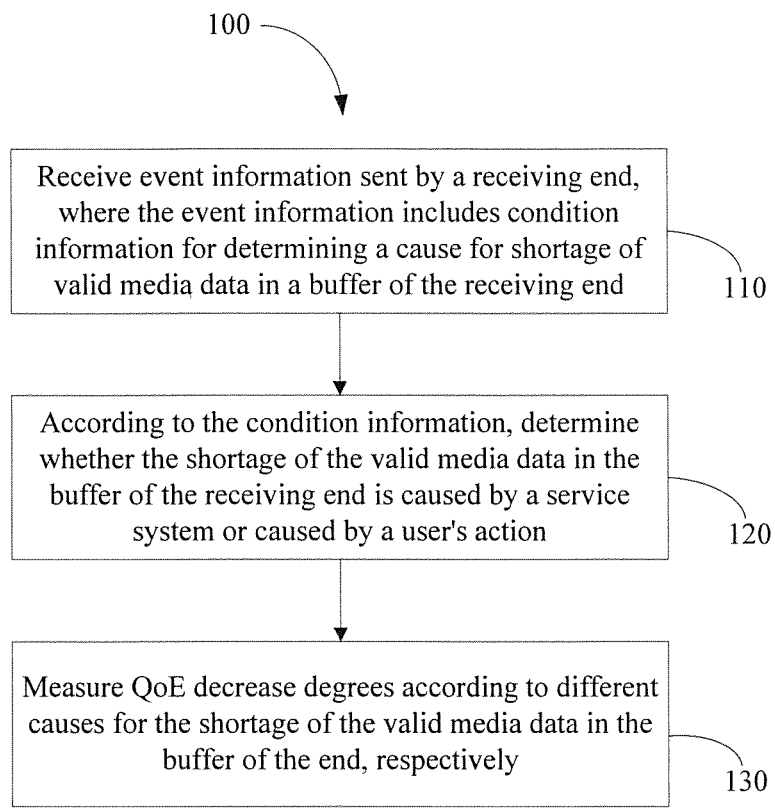
FIG. 1 is a flowchart of a method for measuring QoE according to an embodiment of the present invention.

As shown in FIG. 1, an embodiment provides a method 100 for measuring user quality of experience QoE, where the method includes the following:

110. Receive event information sent by a receiving end, where the event information includes condition information for determining a cause for shortage of valid media data in a buffer of the receiving end.

In a transmission process of network media, media data is divided into multiple data packets. These data packets are transmitted to the receiving end as stream, and are temporarily stored in a buffer of the receiving end. When the amount of data stored in the buffer of the receiving end is sufficient for the receiving end to extract and display to a user, the receiving end starts to play a corresponding media program. When a media service system is faulty or the user drags a sliding bar of the media program in a course of watching the media program, the amount of data in the buffer of the receiving end decreases. When the amount of data in the buffer of the receiving end decreases to a certain degree, that is, valid media data in the buffer of the receiving end is short which causes the receiving end to fail to read sufficient data from the buffer to maintain normal playing of the media program, the receiving end may freeze the image in the media playing, start to rebuffer, and send rebuffer (Rebuffering) to a QoE monitoring server. The service system refers to a combination of various segments in a complete process of transmitting and playing media data. In addition, it may be understood that in the embodiment of the present invention, the user's action is described by using the user's dragging of the progress bar, but is not limited to the user's dragging of the progress bar. The user's action may refer to a manual operation of the user that causes the valid media data in the buffer to be short and the receiving end to rebuffer. The event information includes the condition information for determining the cause for the rebuffer, where the condition information is used by the QoE monitoring server to determine the cause for the shortage of the valid media data in the buffer of the receiving end. Specifically, the condition information includes: media time stamp information in a process of playing media, that is, time at which valid media data in the buffer becomes short, where the time represents a media time stamp when the playing stops because the valid media data in the buffer is short in the process of playing the media by the receiving end; and time at which the media playing resumes, where the time represents a media time stamp when the media playing process resumes. The time at which the valid media data in the buffer becomes short and the time at which the media playing resumes at the receiving end are both represented by using a time stamp (time stamp) method, where a unit of a time stamp is DTS (Decode Time Stamp, decoding time stamp), PTS (Presentation Time Stamp, presentation time stamp), NPT (Normal Play Time, normal play time), or the like. In addition, it should be noted that in the embodiment, the condition information in the event information sent by the receiving end includes two time points in the media playing process, that is, time at which the valid media data in the buffer becomes short and time at which the receiving end resumes media playing, so that the QoE monitoring server independently determines whether the shortage of the valid media data in the buffer of the receiving end is caused by the service system or caused by the user's action. However, the present invention is not limited to the time stamps of the two time points sent by the receiving end. In the embodiment of the present invention, the condition information may be a feature flag, where the feature flag is used to represent the cause for the shortage of the valid media data in the buffer of the receiving end. The QoE monitoring server determines the cause for the shortage of the valid media data in the buffer of the receiving end by using the feature flag in the event information, thereby measuring QoE decrease degrees. Specifically, the implementation is as follows:

A stop flag (Stop flag) is added in the event information sent by the receiving end, thereby distinguishing whether the shortage of the valid media data in the buffer of the receiving end is caused by the service system or caused by the user's action. If the shortage is caused by the service system, for example, a QoS decrease, the stop flag is valid; otherwise, the stop flag is invalid. A format of the condition information sent by the receiving end may be Rebuffering: Stop flag.

Alternatively, the embodiment of the present invention may also determine the cause for the shortage of the valid media data in the buffer of the receiving end by using the following condition information.

A seek flag (Trick mode flag) is added in the event information sent by the receiving end, thereby distinguishing whether the shortage of the valid media data in the buffer of the receiving end is caused by the service system or caused by the user's action. If the shortage is caused by the service system, the drag flag is valid; otherwise, the drag flag is invalid.

Alternatively, the embodiment of the present invention may also determine the cause for the shortage of the valid media data in the buffer of the receiving end by using the following condition information.

An event flag (Event) is added in the event information sent by the receiving end, thereby distinguishing various events that occur in the media playing process of the receiving end. An event type in the event information sent by the receiving end may be represented as Event: Stop, Trick mode, or Seek, where only one event may occur at a time. Specifically, if the event flag (Event) is identified as stop (Stop), it indicates that the shortage of the valid media data in the buffer of the receiving end is caused by the service system; and if the event (Event) is identified as drag Trick mode or Seek, the shortage of the valid media data in the buffer of the receiving end is caused by the user's action. The QoE monitoring server determines, by checking the event flag, whether the shortage of the valid media data in the buffer of the receiving end is caused by the service system or caused by the user's action. Only three events, namely, a combination of stop and drag, are listed in the event flag (Event) in this implementation manner; however, the event flag is not limited to the above events. The event flag is available in multiple different selections or variations according to requirements.

Alternatively, the embodiment of the present invention may also determine the cause for the shortage of the valid media data in the buffer of the receiving end by using the following condition information.

A drag may be defined as a special initial buffering process, that is, a new buffering type identification flag for identifying the cause for the shortage of the valid media data in the buffer of the receiving end is added in Initial buffering. When the receiving end sends the event information (Event), the buffering type identification flag is activated. Specifically, a buffering flag is added in initial event information. Specifically, a drag flag (Seek flag) is added, and if the shortage of the valid media data in the buffer is caused by the user's action, the drag flag is valid; otherwise, the drag flag is invalid. A format of the QoE parameter sent by the receiving end may be Initial buffering: Seek flag.

120. Determine, according to the condition information, whether the shortage of the valid media data in the buffer of the receiving end is caused by the service system or caused by the user's action.

When determining information for determining the cause for the shortage of the valid media data in the buffer of the receiving end in the event information is time stamp information in the media playing process of the receiving end, the QoE monitoring server determines, by comparing the time at which the valid media data in the buffer becomes short and the time at which the receiving end resumes media playing, the cause for the shortage of the valid media data in the buffer of the receiving end; if the time at which the valid media data in the buffer becomes short and the time at which the receiving end resumes media playing are the same or close, or are different by Delta time units (where Delta is a very small time value), determines that the shortage of the valid media data in the buffer of the receiving end is caused by the service system; and if the time at which the valid media data in the buffer becomes short and the time at which the receiving end resumes media playing do not meet the condition, that is, time stamps of the two time points are different by more than two time stamps, it is deemed that the shortage of the valid media data in the buffer of the receiving end is caused by the user's action.

Specifically, assuming that the two time points are recorded as T1 and T2, respectively, that is, the time at which the valid media data in the buffer becomes short is T1, and the time at which the receiving end resumes media playing is T2, in a case where the T1 and T2 use NPT as time stamps, and 30 frames are played per second, if T1 is 91.5 and T2 is 91.467, because in the mode where NPT is used as a time stamp, the time increases by a unit of 0.033, the T1 and the T2 are different exactly by Delta=0.033. In such a case, it may be determined that the shortage of the valid media data in the buffer is caused by the service system, for example, a QoS decrease. If T1 is 100 and T2 is 91.467, start time and end time are different by multiple time units, and therefore, it may be determined that the shortage of the valid media data in the buffer is caused by the user's action, for example, dragging. In a case where T1 and T2 use PTS or DTS as time stamps, 15 frames are played per second, and a time stamp increases by a unit of 67, if T1 is 3267 and T2 is 3200, T1 and T2 are different by Delta=67 unit time, and therefore, it is determined that the shortage of the valid media data in the buffer is caused by the service system. If T1 is 22600 and T2 is 3267, T1 and T2 are different by more than Delta unit time, and therefore, it may be determined that the shortage of the valid media data in the buffer of the receiving end is caused by the user's action.

When the determining information for determining the cause for the shortage of the valid media data in the buffer of the receiving end in the event information is a stop flag, a drag flag, an event flag, or a buffering type identification flag in the event information, the QoE monitoring server determines, by monitoring states of the various flags, whether the shortage of the valid media data in the buffer is caused by the service system or caused by the user's action. Specifically, when the event information reported by the receiving end includes a stop flag, the QoE monitoring server determines, by checking whether the stop flag is valid, whether the shortage of the valid media data in the buffer of the receiving end is caused by the service system or caused by the user's action; when the event information reported by the receiving end includes a drag flag, the QoE monitoring server determines, by checking whether the drag flag is valid, whether the shortage of the valid media data in the buffer of the receiving end is caused by the service system or caused by the user's action; when the event information reported by the receiving end includes an event flag, the QoE monitoring server determines, according to the event flag, whether the shortage of the valid media data in the buffer of the receiving end is caused by the service system or caused by the user's action; and when the event information reported by the receiving end includes a buffering type identification flag, the QoE monitoring server determines, according to whether the buffering type identification flag is valid, whether the shortage of the valid media data in the buffer of the receiving end is caused by the service system or caused by the user's action.

130. Measure QoE decrease degrees according to different causes for the shortage of the valid media data in the buffer of the end, respectively.

In this step, when the determination shows that the shortage of the valid media data in the buffer of the receiving end is caused by the service system, and typically, caused by the service system, for example, caused by network congestion and a media server fault, where the service system includes end-to-end service-relevant components, such as a head end, a network, and a terminal, corresponding QoS needs to be started to clear the fault, where QoS adjustment may be a policy such as increasing a transmission priority of the media data stream received by the receiving end, and/or reducing a waiting delay in a queue, and/or reducing a probability of active dropping, and/or increasing transmit power. Starting the QoS adjustment policy may be implemented by using a media server, or be implemented by interaction between QoE probes in distributed deployment. When the determination shows that the shortage of the valid media data in the buffer of the receiving end is caused by the user's action, it is deemed that the impact of the shortage of the valid media data at the receiving end caused by the user's action on user QoE is much smaller than the impact of lack of valid buffer data at the receiving end caused by the service system on user QoE, such as a QoS decrease. Therefore, different measuring modes are required to measure QoE change rates of two different causes, thereby providing an accurate basis for whether to start QoS adjustment.

In the method for measuring QoE according to the embodiment of the present invention, QoE decrease degrees are calculated by determining causes for rebuffering, respectively, which provides a basis for subsequent QoS optimization, thereby effectively ensuring QoE and implementing proper use of network resources at the same time.

Figure 2:
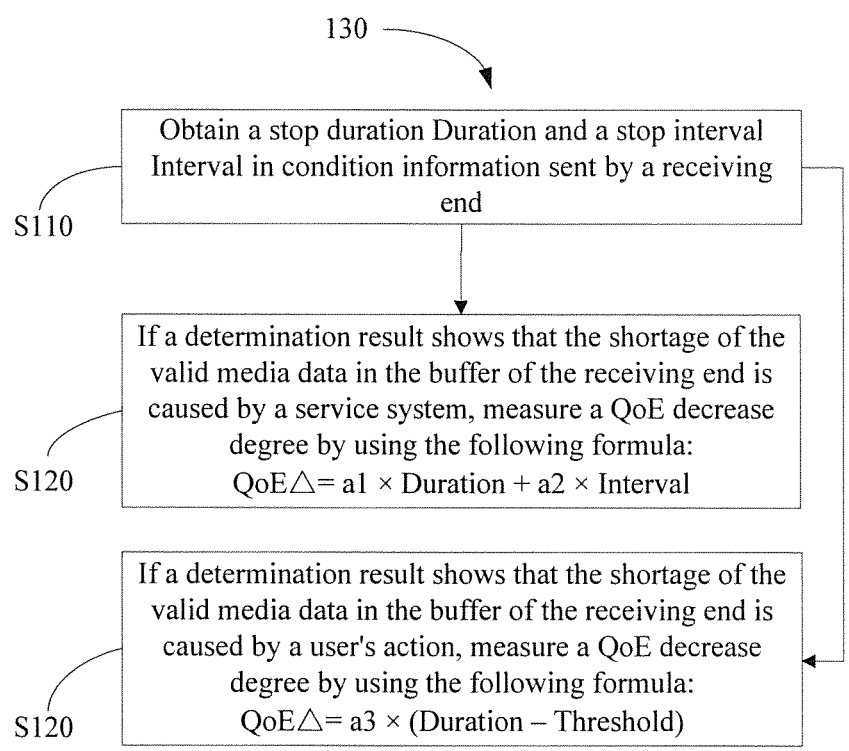
FIG. 2 is a flowchart for measuring a QoE decrease degree in a method for measuring QoE in FIG. 1.

A QoE decrease degree is a basis for starting QoS adjustment. As shown in FIG. 2, in the embodiment of the present invention, measuring QoE decrease degrees according to different causes for the shortage of the valid media data in the buffer, respectively, includes the following:

S110. Obtain a stop duration (Duration) and a stop interval (Interval) in the condition information sent by the receiving end.

The Duration represents a duration from the time at which the shortage of the valid media data in the buffer causes the receiving end to rebuffer to the time at which the receiving end resumes media playing, and the Interval represents a media playing time stamp interval between the time at which the valid media data in the buffer becomes short and the time at which the valid media data in the buffer becomes short last time.

S120. If a determination result shows that the shortage of the valid media data in the buffer of the receiving end is caused by the service system, measure a QoE decrease degree QoEΔ by using the following formula:

$$QoE\Delta = a1 \times \text{Duration} + a2 \times \text{Interval}$$

where, a1 is a coefficient of QoE change caused by the stop duration, and a2 is a coefficient of QoE change caused by the stop interval.

Specifically, in the method, by using a model coefficient table, a corresponding model coefficient (a1, a2) is obtained, where more specifically, the model coefficient may be (10.6, −0.7). The obtained model coefficient and the event information are used as input parameters of a hybrid model to calculate the QoE change rate QoEΔ caused by a QoS decrease, where a specific formula is:

$$QoE\Delta = 10.6 \times \text{Duration} - 0.7 \times \text{Interval}$$

where, 10.6 is a coefficient for calculating a QoE decrease caused by the stop duration, and −0.7 is a coefficient for calculating QoE change caused by the stop interval.

S130. If a determination result shows that the shortage of the valid media data in the buffer of the receiving end is caused by the user's action, measure a QoE decrease degree by using the following formula:

$$QoE\Delta = a3 \times (\text{Duration} - \text{Threshold})$$

where, a3 is a coefficient of QoE change; the Duration represents a duration from the time at which the shortage of the valid media data in the buffer causes the receiving end to rebuffer to the time at which the receiving end resumes media playing; and Threshold is a QoE threshold representing a duration that the user may tolerate, and its unit is the same as that of the Duration.

Figure 3:
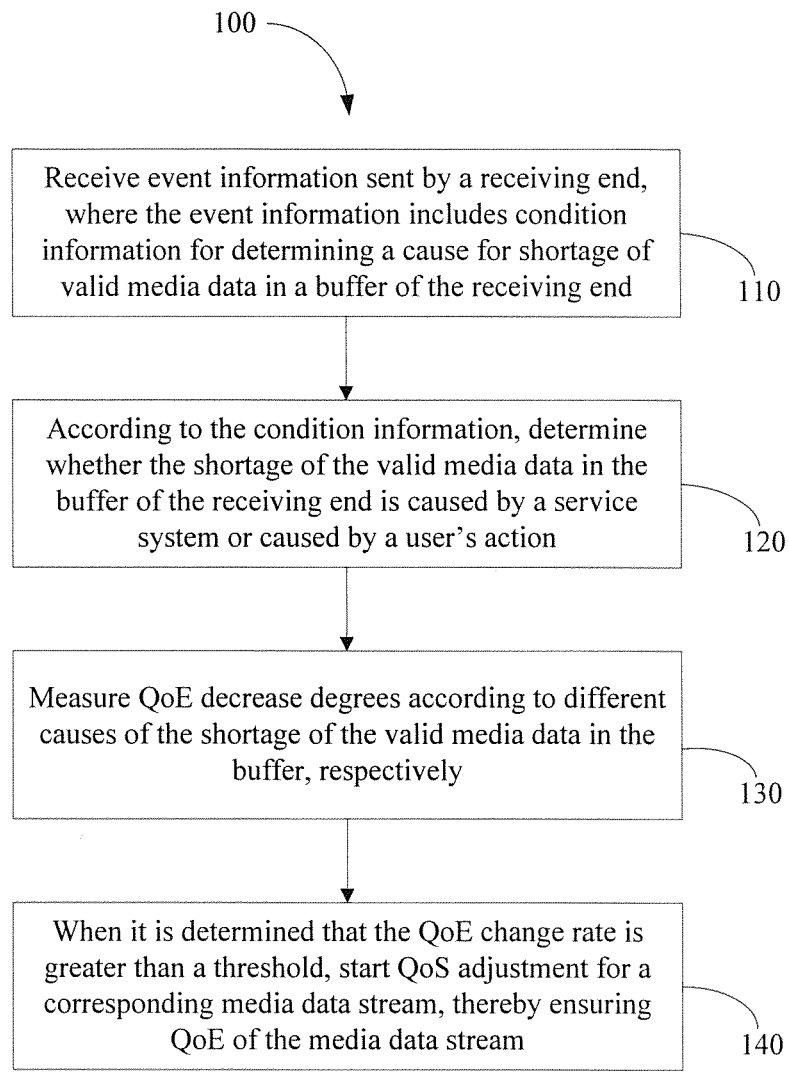
FIG. 3 is a flowchart of a method for measuring QoE according to another embodiment of the present invention.

In addition, as shown in FIG. 3, in the method for measuring QoE according to an embodiment of the present invention, the following is further included:

140. When it is determined that the QoE change rate is greater than a threshold, start QoS adjustment for corresponding media data stream, thereby ensuring QoE of the media data stream.

The method also includes calculating a QoE value, thereby ensuring that the QoE value after the QoS adjustment can meets a user's requirements. The QoE value may be calculated by obtaining media sampling information of the media data stream, where the media sampling information includes information such as codec information (Codec Information), codec image size (Codec Image Size), bit rate (Bit rate), and frame rate (Frame rate). After the media sampling information of the media data stream is obtained, a model coefficient table is used to obtain a corresponding model coefficient (a0, a1, a2), and the obtained model coefficient and the event information are used as input parameters of a hybrid model to calculate the QoE value. A specific calculation formula is as follows:

$$QoE = a0 - QoE\Delta = a0 - (a1 \times \text{Duration} + a2 \times \text{Interval})$$

where, a0 is obtained by calculation according to the codec information, codec image size, and bit rate of video information; a1 is a coefficient for calculating a QoE decrease caused by a stop duration (Duration); and a2 is a coefficient for calculating QoE change caused by a stop interval (Interval).

The media sampling information may be included in the event information, and the receiving end sends the event information including the media sampling information to the QoE monitoring server, so that the QoE monitoring server can calculate the QoE value of the media data stream according to the media sampling information, thereby ensuring that the QoE after adjustment meets the user's expectation.

In the method for measuring user quality of experience QoE according to the embodiment of the present invention, a QoE change rate is calculated according to different causes of the buffer decrease of the receiving end, so that a QoE change rate may be measured more objectively and accurately, thereby providing an accurate basis for whether to start QoS adjustment.

Further, the stop interval (Interval) may also be obtained by calculation by using the following formula according to the time T1 at which the valid media data in the buffer becomes short and which is sent by the receiving end and the time at which the receiving end starts media playing:

$$\text{Interval} = \text{Duration} + T2 - T1$$

where, T1 is a media playing time stamp when the shortage of the valid media data in the buffer occurs at the receiving end, and T2 is a media playing time stamp when the receiving end resumes media playing.

Still further, if shortage of valid media data caused by the user's action, such as dragging by the user, occurs at the receiving end between two stop intervals caused by two occasions of shortage of valid media data in the buffer caused by the service system, in the event information sent by the receiving end, start (Start) time $T3\_i$ and end time $T4\_i$ of the user's action (dragging) occurring in a rebuffering process is added, and the following calculation formula is used to obtain the stop interval:

$$\text{Interval} = \text{Duration} + T2 - T1 - \Sigma(T4\_i - T3\_i) + \Sigma Ds\_i$$

where, $T4\_i$ and $T3\_i$ are start time and end time of an $i^{th}$ drag, respectively, and $\Sigma Ds\_i$ is a total playing stop duration caused by the $i^{th}$ drag, where i is a positive integer.

In addition, if a pause further occurs at the receiving end between two stop intervals caused by two occasions of shortage of valid media data in the buffer caused by the service system, the receiving end may also send pause (Pause) duration (Duration) information, and the following calculation formula is used to obtain the stop interval:

$$\text{Interval} = \text{Duration} + T2 - T1 - \Sigma(T4\_i - T3\_i) + \Sigma Ds\_ + \Sigma Dp\_i$$

where, ΣDp_i is a total duration of i pauses in a rebuffering process.

Based on the embodiments provided by the present invention, the receiving end sends different parameters, and a server end may calculate a required current Interval value according to the sent parameters, thereby further obtaining the QoE change rate QoEΔ.

Figure 4:
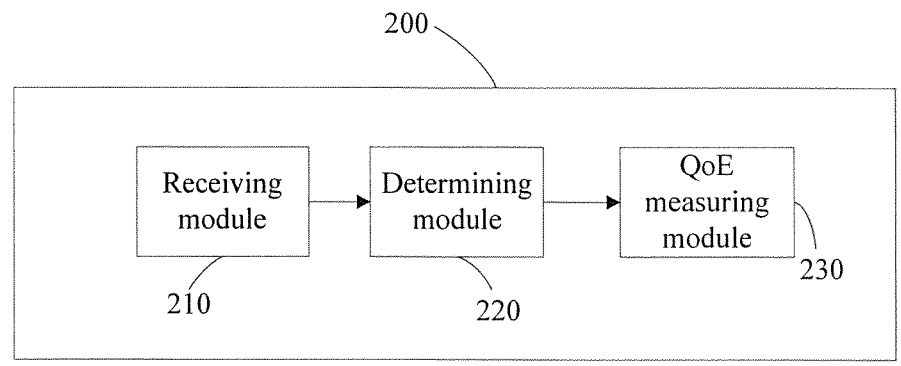
FIG. 4 is a schematic diagram of an apparatus for measuring QoE according to an embodiment of the present invention.

As shown in FIG. 4, an embodiment provides an apparatus 200 for measuring user quality of experience QoE, where the apparatus 200 for measuring user quality of experience QoE is configured to implement the above method, and may work on a network media server or as a separate device in cooperation with a media server. The apparatus 200 includes the following modules.

A receiving module 210 is configured to receive event information sent by a receiving end, where the event information includes condition information for determining a cause for shortage of valid media data in a buffer of the receiving end.

In a transmission process of network media, media data is divided into multiple data packets. These data packets are transmitted to the receiving end as stream, and are temporarily stored in a buffer of the receiving end. When the amount of data stored in the buffer of the receiving end is sufficient for the receiving end to extract and present to a user, the receiving end starts to play a corresponding media program. When a media service system is faulty or the user drags a progress bar of the media program in a process of watching the media program, the amount of data in the buffer of the receiving end decreases. When the amount of data in the buffer of the receiving end decreases to a certain degree, that is, valid media data in the buffer of the receiving end is short, causing the receiving end to fail to read sufficient data from the buffer to maintain normal playing of the media program that is being played, the receiving end may start to rebuffer, and send rebuffering (Reuffering) information to a QoE monitoring server. In addition, it may be understood that in the embodiment of the present invention, the user's action is described by using the user's dragging of the progress bar, but is not limited to the user's dragging of the progress bar. The user's action may refer to a manual operation of the user that causes the valid media data in the buffer to be short and the receiving end to rebuffer. The event information includes the condition information for determining the cause for the rebuffering, where the condition information is used by the QoE monitoring server to determine the cause for the shortage of the valid media data in the buffer of the receiving end. Specifically, the condition information received by the receiving module 210 includes: media timestamp information in a process of playing media, that is, time at which valid media data in the buffer becomes short, where the time represents a media timestamp when the playing stops because the valid media data in the buffer is short in the process of playing the media by the receiving end; and time at which the media playing resumes, where the time represents a media timestamp when the media playing process resumes. The time at which the valid media data in the buffer becomes short and the time at which the media playing resumes at the receiving end are both represented by using a time stamp (time stamp) method, where a unit of a time stamp is DTS (Decode Time Stamp, decoding time stamp), PTS (Presentation Time Stamp, presentation time stamp), NPT (Normal Play Time, normal play time), or the like. In addition, it should be noted that in the embodiment, the condition information in the event information sent by the receiving end includes two time points in the media playing process, that is, time at which the valid media data in the buffer becomes short and time at which the receiving end resumes media playing, so that the QoE monitoring server independently determines whether the shortage of the valid media data in the buffer of the receiving end is caused by the service system or caused by the user's action. However, the present invention is not limited to the time stamps of the two time points sent by the receiving end. In the embodiment of the present invention, the condition information may be a feature flag, where the feature flag is used to represent the cause for the shortage of the valid media data in the buffer of the receiving end. The QoE monitoring server determines the cause for the shortage of the valid media data in the buffer of the receiving end by using the feature flag in the event information, thereby measuring QoE decrease degrees. Specifically, the implementation is as follows:

A stop flag (Stop flag) is added in the event information sent by the receiving end, thereby distinguishing whether the shortage of the valid media data in the buffer of the receiving end is caused by the service system or caused by the user's action. If the shortage is caused by the service system, for example, a QoS decrease, the stop flag is valid; otherwise, the stop flag is invalid. A format of the condition information sent by the receiving end may be Rebuffering: Stop flag.

Alternatively, the embodiment of the present invention may also determine the cause for the shortage of the valid media data in the buffer of the receiving end by using the following condition information.

A drag flag (Trick mode flag) is added in the event information sent by the receiving end, thereby distinguishing whether the shortage of the valid media data in the buffer of the receiving end is caused by the service system or caused by the user's action. If the shortage is caused by the service system, the drag flag is valid; otherwise, the drag flag is invalid.

Alternatively, the embodiment of the present invention may also determine the cause for the shortage of the valid media data in the buffer of the receiving end by using the following condition information.

An event flag (Event) is added in the event information sent by the receiving end, thereby distinguishing various events that occur in the media playing process of the receiving end. An event type in the event information sent by the receiving end may be represented as Event: Stop, Trick mode, or Seek, where only one event may occur at a time. Specifically, if the event flag (Event) is identified as stop (Stop), it indicates that the shortage of the valid media data in the buffer of the receiving end is caused by the service system; and if the event (Event) is identified as drag (Trick mode or Seek), the shortage of the valid media data in the buffer of the receiving end is caused by the user's action. The QoE monitoring server determines, by checking the event flag, whether the shortage of the valid media data in the buffer of the receiving end is caused by the service system or caused by the user's action. Only three events, namely, a combination of stop and drag, are listed in the event flag (Event) in this implementation manner; however, the event flag is not limited to the above events. The event flag is available in multiple different selections or variations according to requirements.

Alternatively, the embodiment of the present invention may also determine the cause for the shortage of the valid media data in the buffer of the receiving end by using the following condition information.

A drag may be defined as a special Initial buffering process, that is, a new buffering type identification flag for identifying the cause for the shortage of the valid media data in the buffer of the receiving end is added in Initial buffering. When the receiving end sends the event information (Event), the buffering type identification flag is activated. Specifically, a buffering flag is added in initial event information. Specifically, a drag flag (Seek flag) is added, and if the shortage of the valid media data in the buffer is caused by the user's action, the drag flag is valid; otherwise, the drag flag is invalid. A format of the QoE parameter sent by the receiving end may be Initial buffering: Seek flag.

A determining module 220 is configured to determine, according to the condition information, whether the shortage of the valid media data in the buffer of the receiving end is caused by the service system or caused by the user's action.

When determining information for determining the cause for the shortage of the valid media data in the buffer of the receiving end in the event information is time stamp information in the media playing process of the receiving end, the determining module 220 is further configured to determine, by comparing the time at which the valid media data in the buffer becomes short and the time at which the receiving end resumes media playing, the cause for the shortage of the valid media data in the buffer of the receiving end; if the time at which the valid media data in the buffer becomes short and the time at which the receiving end resumes media playing are the same or close, or are different by Delta time units, where Delta is a time value set according to a scenario requirement, determine that the shortage of the valid media data in the buffer of the receiving end is caused by the service system; and if the time at which the valid media data in the buffer becomes short and the time at which the receiving end resumes media playing do not meet the condition, that is, time stamps of the two time points are different by more than two time stamps, deem that the shortage of the valid media data in the buffer of the receiving end is caused by the user's action.

Specifically, assuming that the two time points are recorded as T1 and T2, respectively, that is, the time at which the valid media data in the buffer becomes short is T1, and the time at which the receiving end resumes media playing is T2, in a case where the T1 and T2 use NPT as time stamps, and 30 frames are played per second, if T1 is 91.5 and T2 is 91.467, because in the mode where NPT is used as a time stamp, the time increases by a unit of 0.033, the T1 and the T2 are different exactly by Delta=0.033. In such a case, it may be determined that the shortage of the valid media data in the buffer is caused by the service system, for example, a QoS decrease. If T1 is 100 and T2 is 91.467, start time and end time are different by Delta time units, and therefore, it may be determined that the shortage of the valid media data in the buffer is caused by the user's action, for example, dragging. In a case where T1 and T2 use PTS or DTS as time stamps, 15 frames are played per second, and a time stamp increases by a unit of 67, if T1 is 3267 and T2 is 3200, T1 and T2 are different by Delta=67 unit time, and therefore, it is determined that the shortage of the valid media data in the buffer is caused by the service system. If T1 is 22600 and T2 is 3267, T1 and T2 are different by more than Delta unit time, and therefore, it may be determined that the shortage of the valid media data in the buffer of the receiving end is caused by the user's action.

When the determining information for determining the cause for the shortage of the valid media data in the buffer of the receiving end in the event information is a stop flag, a drag flag, an event flag, or a buffering type identification flag in the event information, the determining module 220 is further configured to determine, by monitoring states of the various flags, whether the shortage of the valid media data in the buffer is caused by the service system or caused by the user's action. Specifically, when the event information reported by the receiving end includes a stop flag, the determining module 220 is further configured to determine, by checking whether the stop flag is valid, whether the shortage of the valid media data in the buffer of the receiving end is caused by the service system or caused by the user's action; when the event information reported by the receiving end includes a drag flag, the determining module 220 is further configured to determine, by checking whether the drag flag is valid, whether the shortage of the valid media data in the buffer of the receiving end is caused by the service system or caused by the user's action; when the event information reported by the receiving end includes an event flag, the determining module 220 is further configured to determine, according to the event flag, whether the shortage of the valid media data in the buffer of the receiving end is caused by the service system or caused by the user's action; and when the event information reported by the receiving end includes a buffering type identification flag, the determining module 220 is further configured to determine, according to whether the buffering type identification flag is valid, whether the shortage of the valid media data in the buffer of the receiving end is caused by the service system or caused by the user's action.

A QoE measuring module 230 is configured to measure QoE decrease degrees according to different causes for the shortage of the valid media data in the buffer of the end, respectively.

In this step, when the determination shows that the shortage of the valid media data in the buffer of the receiving end is caused by the service system, for example, caused by network congestion and a media server fault, a corresponding QoS needs to be started to clear the fault, where QoS adjustment may be a policy such as increasing a transmission priority of the media data stream received by the receiving end, and/or reducing a waiting delay in a queue, and/or reducing a probability of active dropping, and/or increasing transmit power. Starting the QoS adjustment policy may be implemented by using a media server, or be implemented by interaction between QoE probes in distributed deployment. When the determination shows that the shortage of the valid media data in the buffer of the receiving end is caused by the user's action, it is deemed that the impact of the shortage of the valid media data at the receiving end caused by the user's action on user QoE is much smaller than the impact of lack of valid buffer data at the receiving end caused by the service system on user QoE, such as a QoS decrease. Therefore, different measuring modes are required to measure QoE change rates of two different causes, thereby providing an accurate basis for whether to start QoS adjustment.

In the apparatus for measuring QoE according to the embodiment of the present invention, QoE decrease degrees are calculated by determining causes for rebuffering, respectively, which provides a basis for subsequent QoS optimization, thereby effectively ensuring QoE and implementing proper use of network resources at the same time.

Figure 5:
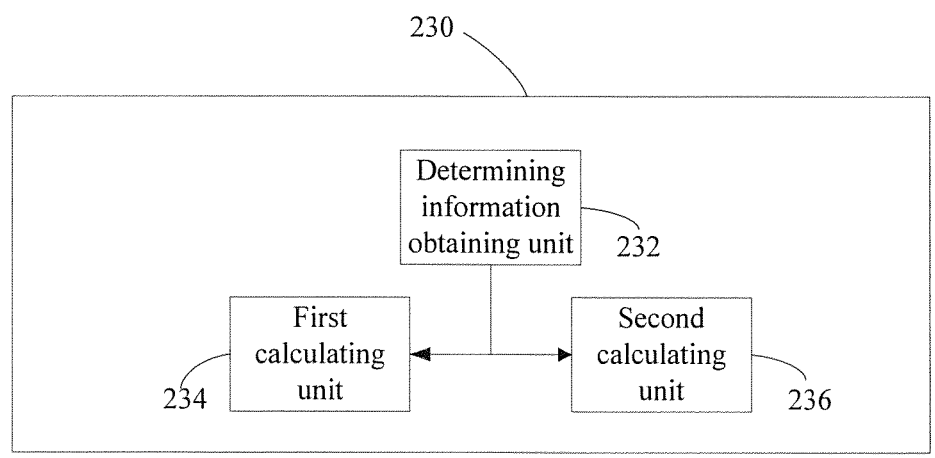
FIG. 5 is a schematic diagram of a QoE measuring module in an apparatus for measuring QoE in FIG. 4.
Figure 6:
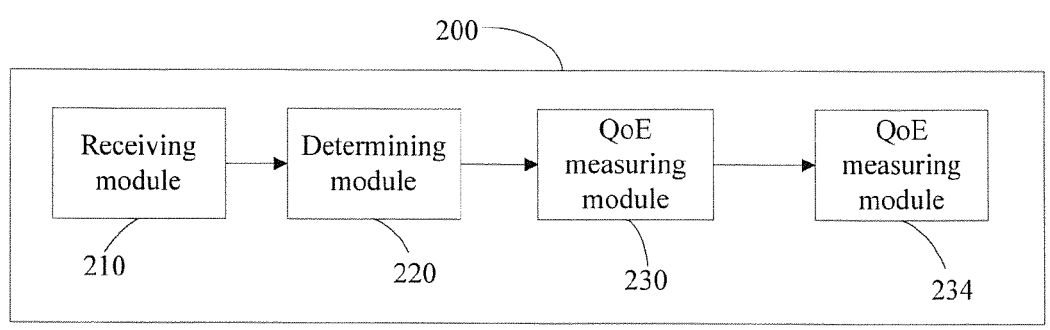
FIG. 6 is a schematic diagram of an apparatus for measuring QoE according to another embodiment of the present invention.

A QoE decrease degree is a basis for starting QoS adjustment. As shown in FIG. 5, the QoE measuring module 230 in the embodiment of the present invention further includes the following.

A determining information obtaining unit 232 is configured to obtain a stop duration Duration and a stop interval Interval in the condition information sent by the receiving end.

The Duration represents a duration from the time at which the shortage of the valid media data in the buffer causes the receiving end to rebuffer to the time at which the receiving end resumes media playing, and the Interval represents a media playing time stamp interval between the time at which the valid media data in the buffer becomes short and the time at which the valid media data in the buffer becomes short last time.

A first calculating unit 234 is configured to, if a determination result shows that the shortage of the valid media data in the buffer of the receiving end is caused by the service system, measure a QoE decrease degree QoEΔ by using the following formula:

$$QoE\Delta = a1 \times Duration + a2 \times Interval$$

where, a1 is a coefficient of QoE change caused by the stop duration, and a2 is a coefficient of QoE change caused by the stop interval.

Specifically, in the method, by using a model coefficient table, a corresponding model coefficient (a1, a2) is obtained, where more specifically, the model coefficient may be (10.6, −0.7). The obtained model coefficient and the event information are used as input parameters of a hybrid model to calculate the QoE change rate QoEΔ caused by a QoS decrease, where a specific formula is:

$$QoE\Delta = 10.6 \times Duration - 0.7 \times Interval$$

where, 10.6 is a coefficient for calculating a QoE decrease caused by the stop duration, and −0.7 is a coefficient for calculating QoE change caused by the stop interval.

A second calculating unit 236 is configured to, if a determination result shows that the shortage of the valid media data in the buffer of the receiving end is caused by the user's action, measure a QoE decrease degree QoEΔ by using the following formula:

$$QoE\Delta = a3 \times (Duration - Threshold)$$

where, a3 is a coefficient of QoE change; the Duration represents a duration from the time at which the shortage of the valid media data in the buffer causes the receiving end to rebuffer to the time at which the receiving end resumes media playing; and Threshold is a QoE threshold representing a duration that the user may tolerate, and its unit is the same as that of the Duration.

In addition, the apparatus 200 for measuring user quality of experience QoE according to the present invention further includes:

a QoS adjusting module 240, configured to, when it is determined that a ΔQoE change rate is greater than a threshold, start QoS adjustment for corresponding media data stream, thereby ensuring QoE of the media data stream.

The module is further configured to calculate a QoE value, thereby ensuring that the QoE value after the QoS adjustment can meet a user's requirements. The QoE value may be calculated by obtaining media sampling information of the media data stream, where the media sampling information includes information such as codec information (Codec Information), codec image size (Codec Image Size), bit rate (Bit rate), and frame rate (Frame rate). After the media sampling information of the media data stream is obtained, a model coefficient table is used to obtain a corresponding model coefficient (a0, a1, a2), and the obtained model coefficient and the event information are used as input parameters of a hybrid model to calculate the QoE value. A specific calculation formula is as follows:

$$QoE = a0 - QoE\Delta = a0 - (a1 \times Duration + a2 \times Interval)$$

where, a0 is obtained by calculation according to the Codec Information, Codec Image Size, and Bit rate of video information; a1 is a coefficient for calculating a QoE decrease caused by a stop duration (Duration); and a2 is a coefficient for calculating QoE change caused by a stop interval (Interval).

The media sampling information may be included in the event information, and the receiving end sends the event information including the media sampling information to the QoE monitoring server, so that the QoE monitoring server can calculate the QoE value of the media data stream according to the media sampling information, thereby ensuring that the QoE after adjustment meets the user's expectation.

In the apparatus 200 for measuring user quality of experience QoE according to the embodiment of the present invention, QoE change rates are calculated according to different causes of the buffer decrease of the receiving end, respectively, so that a QoE change rate may be measured more objectively and accurately, thereby providing an accurate basis for whether to start QoS adjustment.

Further, the stop interval (Interval) may also be obtained by calculation by using the following formula according to the time T1 at which the valid media data in the buffer becomes short and which is sent by the receiving end and the time at which the receiving end starts media playing:

$$Interval = Duration + T2 - T1$$

where, T1 is a media playing time stamp when the shortage of the valid media data in the buffer occurs at the receiving end, and T2 is a media playing time stamp when the receiving end resumes media playing.

Still further, if shortage of valid media data caused by the user's action, such as dragging by the user, occurs at the receiving end between two stop intervals caused by two occasions of shortage of valid media data in the buffer caused by the service system, in the event information sent by the receiving end, start (Start) time T3_i and end time T4_i of the user's action (dragging) occurring in a rebuffering process is added, and the following calculation formula is used to obtain the stop interval:

$$Interval = Duration + T2 - T1 - \Sigma(T4\_i - T3\_i) + \Sigma Ds\_i$$

where, T4_i and T3_i are start time and end time of an i$^{th}$ drag, respectively, and ΣDs_i is a total playing stop duration Duration caused by the i$^{th}$ drag, where i is a positive integer.

In addition, if a pause further occurs at the receiving end between two stop intervals caused by two occasions of shortage of valid media data in the buffer caused by the service system, the receiving end may also send pause (Pause) duration (Duration) information, and the following calculation formula is used to obtain the stop interval:

$$Interval = Duration + T2 - T1 - \Sigma(T4\_i - T3\_i) + \Sigma Ds\_ + \Sigma Dp\_i$$

where, ΣDp_i is a total duration of i pauses in a rebuffering process.

Based on the embodiments provided by the present invention, the receiving end sends different parameters, and a server end may calculate a required current Interval value according to the sent parameters, thereby further obtaining the QoE change rate QoEΔ.

Through the foregoing description of the embodiments, it is clear to a person skilled in the art that the present invention may be implemented by software plus necessary universal hardware, and definitely may also be implemented by hardware, but in many cases, the software implementation is preferred. Based on such understanding, the technical solutions of the present invention essentially, or the part contributing to the prior art may be implemented in a form of a software product. The computer software product is stored in a readable storage medium, for example, a floppy disk, hard disk, or optical disk of the computer, and includes several instructions for instructing a computer device (which may be a personal computer, a server, or a network device) to perform the methods described in the embodiments of the present invention.

What is claimed is:

1. A method for feeding back infatuation by a receiving end, the method comprising:
   receiving media data;
   playing the media data;
   reporting event information, wherein the event information comprises condition information, the condition information comprises a feature flag representing a cause for a shortage of valid media data in a buffer of the receiving end; and
   receiving a corresponding media stream which is adjusted based on the reported event information, wherein the event information enables starting a quality of service (QoS) adjustment for the corresponding media stream based on the reported event information in order to ensure quality of experience (QoE) of the media stream;
   wherein the event information further comprises:
   a stop duration that represents a duration from a time at which the shortage of valid media data in the buffer causes the receiving end to rebuffer to a time at which the receiving end resumes media playing, and
   a stop interval that represents a media playing time stamp interval between a time at which the valid media data in the buffer becomes short and a time at which the valid media data in the buffer becomes short last time.

2. The method for feeding back information according to claim 1, wherein the cause for the shortage of valid media data in the buffer of the receiving end comprises:
   a service system or a user's action.

3. The method for feeding back information according to claim 1, wherein different causes for the shortage of valid media data in the buffer correspond to different quality of experience (QOE) measuring modes.

4. The method for feeding back information according to claim 1, wherein:
   the condition information comprises a first time at which valid media data in the buffer becomes short and a second time at which the receiving end resumes media playing, and the first time and the second time refer to time stamps when the receiving end plays media.

5. The method for feeding back information according to claim 1, wherein:
   the feature flag comprises a stop flag.

6. The method for feeding back information according to claim 1, wherein:
   the feature flag comprises a drag flag.

7. The method for feeding back information according to claim 1, wherein:
   the feature flag comprise an event flag comprising an event type; and
   when the event type is identified as a stop it indicates that the shortage of valid media data in the buffer of the receiving end is caused by a service system, and when the event type is identified as a seek, it indicates that the shortage of valid media data in the buffer of the receiving end is caused by a user's action.

8. A receiving end for feeding back information, the receiving end comprising:
   a receiver, configured to receive media data and temporarily store the media data in a buffer of the receiving end;
   a player, configured to extract and play the temporarily stored media data;
   a processor, configured to report event information by the receiving end, wherein the event information comprises condition information, the condition information comprises a feature flag representing a cause for a shortage of valid media data in the buffer of the receiving end; and
   the receiver is configured to receive a corresponding media stream which is adjusted based on the reported event information, wherein the event information enables starting a quality of service (QoS) adjustment for the corresponding media stream based on the reported event information in order to ensure quality of experience (QoE) of the media stream;
   wherein the event information further comprises:
   a stop duration that represents a duration from a time at which the shortage of valid media data in the buffer causes the receiving end to rebuffer to a time at which the receiving end resumes media playing, and
   a stop interval that represents a media playing time stamp interval between a time at which the valid media data in the buffer becomes short and a time at which the valid media data in the buffer becomes short last time.

9. The receiving end for feeding back information according to claim 8, wherein the cause for the shortage of the valid media data in the buffer of the receiving end comprises:
   a service system or a user's action.

10. The receiving end for feeding back information according to claim 8, wherein different causes for the shortage of valid media data in the buffer correspond to different quality of experience (QOE) measuring modes.

11. The receiving end for feeding back information according to claim 8, wherein:
    the condition information comprises a first time at which valid media data in the buffer becomes short and a second time at which the receiving end resumes media playing, and the first time and the second time refer to time stamps when the receiving end plays media.

12. The receiving end for feeding back information according to claim 8, wherein:
    the feature flag comprises a stop flag.

13. The receiving end for feeding back information according to claim 8, wherein:
    the feature flag comprises a drag flag.

14. The receiving end for feeding back information according to claim 8, wherein:
    the feature flag comprises an event flag comprising an event type comprising a stop or a seek; and
    when the event type is identified as a stop, it indicates that the shortage of valid media data in the buffer of the receiving end is caused by a service system, and when the event type is identified as a seek, it indicates that the shortage of valid media data in the buffer of the receiving end is caused by a user's action.

* * * * *